United States Patent Office 3,445,693
Patented May 20, 1969

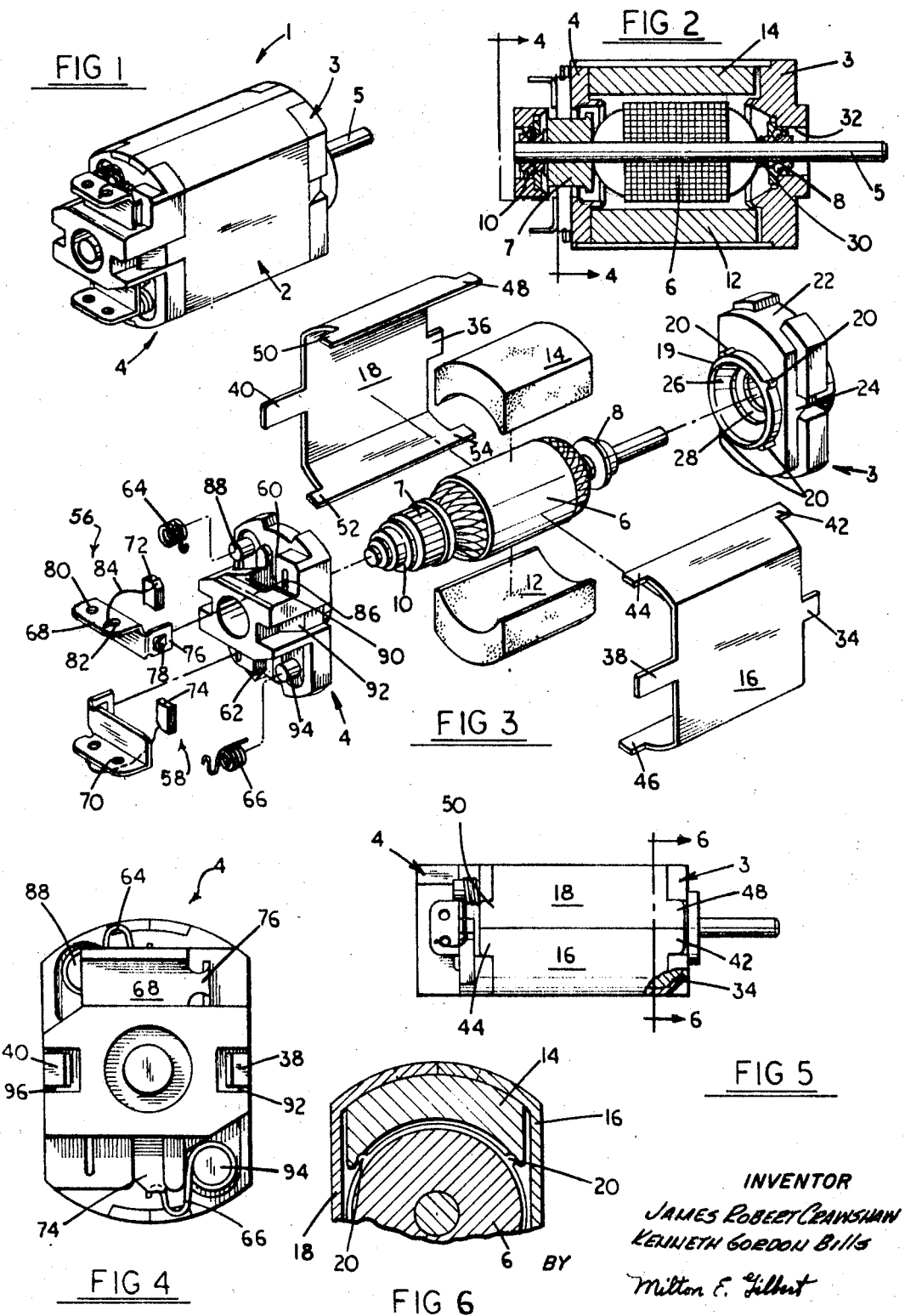

3,445,693
DC MOTOR WITH P-M STATOR, SPLIT HOUSING, AND BRUSH ASSEMBLY
James Robert Crawshaw and Kenneth Gordon Bills, Trotwood, Ohio, assignors, by mesne assignments, to TRW Inc., Cleveland, Ohio, a corporation of Ohio
Filed May 26, 1967, Ser. No. 641,685
Int. Cl. H02k 15/02, 15/14
U.S. Cl. 310—42                                    10 Claims

ABSTRACT OF THE DISCLOSURE

A DC motor comprising a symmetrical housing made in two separated portions held together by a pair of end bells, which provide recesses for a plurality of tabs formed on the housing half-shells. The housing shells are retained on the end bells by these tabs and other tabs which are bent over portions of the end bells in an interlocking manner. One end bell is provided with cammed surfaces to wedge the stator permanent magnets into a position spaced from the armature and against the housing shells. The shells are flattened to be as close to the armature as the magnets in that area which the magnets do not occupy. One end bell is formed with a recessed portion which cooperates with a terminal to form a brush housing to receive and retain both the brush spring and the brush. The terminals are retained in place by a tang pressed into an appropriate recess in the end bell.

Background of the invention

The invention is directed to the field of DC permanent magnet motors. In prior known devices the housing in such motors was generally formed in a cylindrical configuration, and such configuration was usually derived by drawing or spinning into a cup form. Furthermore, in prior devices, special and separate brush mounting arrangements were provided separate and apart from the end bells and then mounted thereto. Such prior devices also employed a housing which was circular in configuration, so that all points of the housing surrounding the armature were radially equidistant therefrom. Additionally, the various segments of the motor were assembled by means of screws and other fastening devices.

Summary of the invention

The invention contemplates a permanent magnet motor in which the housing is formed in two symmetrical pieces which are cut on their centers along the polar axis, and further contemplates the use of tabs and recesses to interlock the outer shell with the end bells. The end bells are molded in such a manner as to provide cammed surfaces to accommodate the wedging action. There are further provided cammed means for wedging the permanent magnets into position and maintaining them in spaced relationship to the armature so as to maintain a constant air gap. The invention also provides a brush assembly formed in part by the end bell and in part by the terminal, which is pressed into the end bell so as to retain both the brush and the brush spring in position. The arrangement thus eliminates multi-motion molds.

Brief description of the drawing

FIGURE 1 is a perspective view of a preferred embodiment of a permanent magnet DC motor constructed according to the teachings of the invention;

FIGURE 2 is a longitudinal cross-sectional view through the motor of FIGURE 1;

FIGURE 3 is an exploded perspective view of the preferred embodiment of FIGURE 1;

FIGURE 4 is an end view taken along line 4—4 of FIGURE 2;

FIGURE 5 is a top view of the preferred embodiment of the invention with a portion sectioned to indicate the use of the tabs to retain the housing portions and the motor in position; and FIGURE 6 is a partial cross-sectional view taken along line 6—6 of FIGURE 5.

Description of the preferred embodiment

As shown in FIGURE 1, the permanent magnet DC motor of the invention consists of a symmetrical housing 2, which is assembled to and retains in position a front end bell 3 and a rear end bell-brush holder 4, to enclose an armature which provides the output shaft 5. As more clearly shown in FIGURE 2, the armature 6 comprises the output shaft 5 and includes the commutator 7 mounted on the shaft. A pair of flanged bearings 8, 10 are also employed, which are appropriately mounted on the shaft 5. A spring 30 is used to permit the motor to absorb end thrusts and provide for slight misalignments.

The housing 2 encloses the permanent magnets 12 and 14 which are arcuately shaped as clearly shown in FIGURE 3. The front end bell 3 is formed to provide a cylindrical extension 19 which has formed thereon a series of cammed surfaces 20 which (as shown in FIGURE 6) serve as a locating and wedging means for the magnets 14 and 16. The magnets are thus held spaced from the armature and up against the housing (see FIGURE 6). We have found that the use of such cams or bosses is desirable on only one end bell, in view of the necessity to provide ease of manufacture. The front end bell is further formed to provide a locking recess 22, which is shown at the upper extremity; and a similar recess (not shown) is formed in the lower extremity of the end bell. These recesses cooperate with the housing portions as described hereinafter, for retention and centering purposes. A tapered surface 24 is also provided for assembly purposes, and a similar surface (not shown) is formed on the opposite side of the end bell. Centrally of the end bell is provided a tapered surface 26, which leads to a bearing seat 28 for retention of the bearing 8. The surface 28 leads to the bore 32, as shown in FIGURE 2.

The housing 2 is formed by two symmetrical and separate housing halves 16 and 18, which may be made of ferromagnetic material. Each housing half is formed of flat sheet-like material with the upper and lower portions bent over in the manner shown in FIGURE 3. The housing half 16 has formed thereon the tangs 34 and 38, and also the tabs 42, 44, 46, and another tab (not shown). The housing half 18 is similarly formed with the tangs 36 and 40 and the tabs 48, 50, 52, and 54. It is clear that upon assembly (see FIGURE 5) the end bells will retain the housing halves 16 and 18 in relatively rigid position with the tabs 42 and 48 held within the recess 22 in a locking manner. Also, the tang 34 is shown as being bent over on the tapered surface 24 of the end bell 3. If desired, and in order to prevent any possible longitudinal relative movement, the two adjacent tabs such as 48, 42 may be soldered together or may be formed with reentrant portions (not shown) or other interlocking or fastening means.

The front end bell 4 is formed in such a manner as to accommodate brush assemblies 56 and 58. The upper brush assembly 56 is adapted to provide one wall of a brush housing, the other portions thereof being formed by the brush recess 60 molded in the end bell 4. Similarly, the lower brush assembly 58 cooperates with the brush recess 62 in the lower portion of the rear end bell 4. Upper and lower torsion springs 64 and 66 are provided to cooperate with the spring mounting bosses 88 and 94, to exert force upon the brushes 72 and 74, respectively, so as to urge them towards the commutator 7. These brushes slide within the brushbox formed as indicated above. The upper brush assembly 56 consists of a terminal 68, which may desirably be formed of hard brass coated with tin and which has a bent over portion 76, a portion of which is formed into a tang 78. This tang 78 and portion 76 fit within a slot 86 formed into a portion of the end bell 4. When the terminal is pressed into position so that the tang 78 serves to retain it within the slot 86, then the main portion of the terminal 68 forms the remaining walls of the brushbox, as indicated above. The brush 72 is provided with a connector 84 which is soldered to the terminal 76 in one of the holes 80, 82 provided therefor. The lower brush terminal 70 is similarly formed in a manner as described above in connection with the upper terminal 68. As shown in FIGURE 4, the lower brush 74 is seen sliding within the brushbox or slot and urged towards the commutator by the spring 66. Also, as shown in FIGURE 4, the tabs 38 and 40 are bent over onto the retaining surfaces 92 and 96, respectively.

What we claim is:
1. A DC motor having, in combination:
   a field including a permanent magnet;
   a pair of end bells providing rotatable bearing means;
   an armature rotatably mounted within said bearing means;
   a housing circumventing and enclosing said armature, said housing being formed of symmetrical half sections abutted together; and
   means formed on said end bells and housing for releasably retaining said assembled motor solely by interference fitting mating portions.

2. The DS motor of claim 1 wherein said latter named means comprises tabs formed on said housing and mating recesses formed upon said end bells, the relative dimensions of said tabs and recesses being such as to provide an interference fit therebetween.

3. The DC motor of claim 1 including tang portions formed on said housing sections, said tang portions being depressed over portions of said end bells to further retain said assembly.

4. The DC motor of claim 1 wherein said housing sections are abutted along a line intersecting the polar axis of said permanent magnet.

5. The DC motor of claim 1 wherein said permanent magnet is formed by spaced apart shell-like sections and said housing sections are of flat sheet stock bent over at their upper and lower portions to accommodate said permanent magnet sections, the inner surface of said housing and magnet sections being so dimensioned as to provide a substantially constant air gap surrounding said armature.

6. The DC motor of claim 5 including means formed upon one of said end bells for forcibly urging said magnet sections against the housing sections so as to maintain the former in position and assure the proper air gap.

7. The DC motor of claim 1 wherein one of said end bells has a portion thereof formed in a partial box-like configuration for receiving and guiding a brush, and integral terminal means assembled adjacent to said one end bell portion to complete a boxed configuration for said brush.

8. The DC motor of claim 7 wherein said armature includes a commutator portion, and a spring mounted upon said end bell in such position as to bear against said brush for urging same towards said commutator, said terminal means being so arranged whereby a portion thereof serves to capture said spring and prevent its disassembly.

9. The DC motor of claim 7 wherein said terminal is provided with a tang portion and said one end bell is formed with a slot for receiving and retaining said terminal.

10. The DC motor of claim 1 wherein said housing sections are abutted along a line intersecting the polar axis of said permanent magnet, one of said end bells has a portion thereof formed in a partial box-like configuration for receiving and guiding a brush, and intergral terminal means assembled adjacent to said one end bell portion to complete a boxed configuration for said brush.

References Cited
UNITED STATES PATENTS

| | | | |
|---|---|---|---|
| 3,156,838 | 11/1964 | Winther | 310—42 |
| 3,231,772 | 1/1966 | Polenschat | 310—246 |
| 3,401,281 | 9/1968 | Martin et al. | 310—42 |
| 3,401,282 | 9/1968 | Zagorski | 310—42 |

WARREN E. RAY, *Primary Examiner.*

U.S. Cl. X.R.

310—46, 89, 154, 246